United States Patent
Tanaka et al.

[11] Patent Number: 6,072,099
[45] Date of Patent: Jun. 6, 2000

[54] PROCESS FOR LOW TEMPERATURE PYROLYSIS OF DIOXINS

[75] Inventors: Tateo Tanaka, Tokyo; Shin Iwakubo, Yokohama; Shinichi Yamada, Kanagawa-ken, all of Japan

[73] Assignee: Sumitomo Heavy Industries, Ltd., Tokyo, Japan

[21] Appl. No.: 09/118,837

[22] Filed: Jul. 20, 1998

[30] Foreign Application Priority Data

Sep. 10, 1997 [JP] Japan ................................ 9-245215

[51] Int. Cl.⁷ .......................... A62D 3/00; B01D 53/00
[52] U.S. Cl. ...................... 588/205; 588/206; 588/207; 588/208; 588/209; 588/210; 208/262.1; 208/262.5
[58] Field of Search ........................ 588/205, 209, 588/210, 206, 207, 208; 208/262.1, 262.5

[56] References Cited

U.S. PATENT DOCUMENTS

| | | | |
|---|---|---|---|
| 4,327,027 | 4/1982 | Howard et al. | 260/340.3 |
| 5,260,047 | 11/1993 | Berger | 423/245.1 |
| 5,414,204 | 5/1995 | Hosono et al. | 588/210 |
| 5,648,591 | 7/1997 | Donecker et al. | 588/205 |

FOREIGN PATENT DOCUMENTS

| | | | |
|---|---|---|---|
| 0 479 350 | 4/1992 | European Pat. Off. | B01D 53/34 |
| 558063 | 2/1993 | European Pat. Off. | B01D 53/34 |
| 574705 | 5/1993 | European Pat. Off. | B01D 53/08 |
| 0 558 063 | 9/1993 | European Pat. Off. | B01D 53/34 |
| 558 063A2 | 9/1993 | European Pat. Off. . | |
| 0 574 705 | 12/1993 | European Pat. Off. | B01D 53/08 |
| 5137812 | 6/1993 | Japan | A62D 3/00 |
| 5-301022 | 11/1993 | Japan . | |
| WO 86/03690 | 7/1986 | WIPO | B01D 53/36 |

OTHER PUBLICATIONS

Grant, Julius, "Hackh's Chemical Dictionary, 4th edition", pp. 26 & 37–40, 1969.

*Primary Examiner*—Steven P. Griffin
*Assistant Examiner*—Eileen E. Nave
*Attorney, Agent, or Firm*—Arent Fox Kintner Plotkin & Kahn, PLLC

[57] ABSTRACT

Pyrolysis of dioxins adsorbed on a carbonaceous adsorbent such as activated carbon or activated cokes is carried out with much higher efficiency by heating a dioxins-adsorbed carbonaceous adsorbent in the presence of an alkali component in an oxygen-deficient state at a oxygen concentration of not more than 1% or in an inert state at 350° C. or higher for at least one hour.

7 Claims, 11 Drawing Sheets

PROCESS FOR LOW TEMPERATURE PYROLYSIS OF DIOXINS

BACKGROUND OF THE INVENTION

1. Field of the Invention

The present invention relates to an improvement of a process for pyrolysis of dioxins by allowing a carbonaceous adsorbent such as activated carbon, activated cokes, etc. to adsorb dioxins, followed by treatment of the dioxins-adsorbed carbonaceous adsorbent at a high temperature (about 1300° C.), such as combustion, etc. More particularly, the present invention relates to a process for pyrolysis of dioxins at a lower temperature. The term "dioxins" herein used is an abbreviation for polychlorodibenzodioxin and polychlorodibenzofuran, both of which belong to organochlorine compounds.

2. Related Art

Processes for pyrolysis of dioxins or dioxins-collected materials by exposing them to a high temperature are well known, but have such disadvantages as large energy consumption due to the pyrolysis at a very high temperature, e.g. about 1,300° C., and inevitable waste of resources due to combustion loss of dioxin collectors, i.e. carbonaceous adsorbent. Furthermore, there are undesirable chances of recombination of the once decomposed dioxins into the original dioxins at the last stage of combustion. Thus, further improvements of the methods are still in demand.

For one of such improvements, the present inventor disclosed a process for low temperature pyrolysis in JP-A 5(1933)-301022, as will be hereinafter referred to under the caption "Disclosed Prior Art", where dioxins are thermally decomposed in an oxygen-deficient state, i.e. at an oxygen concentration of not more than 1% at a temperature of at least 350° C. for at least one hour.

Disclosed Prior Art 1

Disclosed Prior Art as mentioned above will be summarized below, referring to FIGS. 7 and 8, where FIG. 7 shows a parallel flow type, vertical pyrolysis apparatus A and FIG. 8 shows a countercurrent flow type, vertical pyrolysis apparatus A'.

In FIG. 7, the parallel flow type pyrolysis apparatus A is a carbonaceous adsorbent-moving bed type, vertical shell-and-tube heat exchanger reactor having an upper heating section and a lower cooling section. Dioxins-adsorbed carbonaceous adsorbent 1 is charged into the apparatus A from the top through a seal valve 8. The apparatus A has an inlet 2 for a carrier gas (inert gas), an outlet 3 for a desorbed gas, an inlet 4 for a hot gas and an outlet 5 for the hot gas in the heating section. The hot gas is blown into the shell side of the apparatus A from the inlet 4 for the hot gas and ascends in the direction opposite to that of the stream of the carbonaceous adsorbent 1 descending through the tubes of the apparatus A. The apparatus A also has an inlet 6 for cooling water and an outlet 7 for the cooling water in the cooling section and a seal valve 9 at the bottom. Cooling air may be substituted for the above cooling water.

Dioxins-adsorbed carbonaceous adsorbent 1 is charged into the apparatus A from the top, and an inert gas is introduced into the apparatus A from the inlet 2 for the carrier gas to facilitate pyrolysis of dioxins in the heating section of apparatus A. Carbonaceous adsorbent 1 is heated to about 400° C. by indirect heating, i.e. by heat exchange with the hot gas introduced into the shell side from the inlet 4 for the hot gas. The carbonaceous adsorbent 1 is finally discharged at a constant discharge rate through a roll feeder 10 provided at the bottom of the apparatus A. By setting the discharge rate so that the carbonaceous adsorbent 1 can descent through the heating zone at 350° C. or higher for at least one hour, the dioxins can be thermally decomposed and discharge as a desorbed decomposition gas from the outlet 3 for the desorbed gas. The dioxins-freed carbonaceous adsorbent is cooled while descending through the tubes of the apparatus A in the cooling section by indirect cooling, i.e. by heat exchange with the cooling water passing through the shell side of the apparatus A in the cooling section and discharged through the seal valve 9 at the bottom and recycled.

Usually, dioxins are thermally decomposed only at a high temperature, but the carbonaceous adsorbent, if present in a larger proportion to the dioxins, will have an action to break the structures of dioxins at a site of connecting two benzene rings thereof (see FIG. 11). Thus, the complete absence of oxygen in the heating section is ideal for the pyrolysis of dioxins, but an inert gas atmosphere at an oxygen concentration of not more than 1% can be practically effective for substantially complete pyrolysis of the dioxins.

Countercurrent flow type, vertical pyrolysis apparatus A' will be summarized below, referring to FIG. 8, where dioxins-adsorbed carbonaceous adsorbent descends as a moving bed, as in the parallel flow type, vertical pyrolysis apparatus A, but the inlet 2 for carrier gas is provided at the lower level below the heating section and the outlet 3 for desorbed gas is provided at the upper level above the heating section. That is, the inert gas passes upwards in the direction opposite to the descending direction of carbonaceous adsorbent 1, that is, flows in a countercurrent manner. Mode of low temperature pyrolysis is the same as in the case of FIG. 7.

The present inventor also disclosed a process for heating dioxins-adsorbed carbonaceous adsorbent, which also contained adsorbed HCl and $SO_2$ at the same time, (a) in an oxygen-deficient state without any introduction of an inert gas (b) at a low temperature, i.e. 350° C. or higher for at least one hour, as will be summarized below in Disclosed Prior Art 2, whereby energy consumption could be reduced due to the low temperature pyrolysis, (b) the resources could be saved because the dioxins-freed carbonaceous adsorbent can be recycled, and (c) chances of recombining or rebuilding the decomposed dioxins into original dioxins could be eliminated, that is, a completely hazardless state could be obtained.

Disclosed Prior Art 2

FIGS. 9 and 10 show apparatuses for carrying out another process of Disclosed Prior Art in an oxygen-deficient state, as mentioned above, where FIG. 9 shows a parallel flow type, vertical pyrolysis apparatus B and FIG. 10 shows a countercurrent flow type vertical pyrolysis apparatus B'.

In FIG. 9, the parallel flow type pyrolysis apparatus B is a carbonaceous adsorbent-moving bed type, vertical shell-and-tube heat exchange reactor having an upper heating section and a lower cooling section. Dioxins-adsorbed carbonaceous adsorbent 11 is charged into the apparatus B from the top through a seal valve 12. The apparatus B has an outlet 13 for a desorbed gas, an inlet 14 for a hot gas and an outlet for the hot gas in the heating section. The hot gas is blown into the shell side of the apparatus B from the inlet 14 for the hot gas and passes upwards from the down side in the direction opposite to that of the stream of the activated carbon 11 descending through the tubes of the apparatus B.

The apparatus B also has an inlet 16 for cooling water and an outlet 17 for the cooling water in the cooling section and a seal valve 18 at the bottom.

In the above-mentioned structure of the apparatus B, the dioxins-adsorbed carbonaceous adsorbent 11, which has adsorbed HCl and $SO_2$ at the same time, is charged into the apparatus B from the top, heated to at least 350° C. in the heating section by heat exchange with the hot gas passing through the shell side of the apparatus B, while the dioxins-adsorbed carbonaceous adsorbent descends through the tubes of the apparatus B and finally discharged from the feeder 19 provided at the bottom at a constant discharging rate as set to allow the carbonaceous adsorbent 11 to pass through the heating zone at least at 350° C. over at least one hour. In the heating section, the dioxins, $SO_2$ and HCl adsorbed on the carbonaceous adsorbent 11 undergo dechlorination and desorption and the generated gases are withdrawn at the bottom of the heating section in case of the parallel flow type. That is, the gases generated in an oxygen-deficient state are withdrawn therefrom. The dioxins-freed carbonaceous adsorbent 11, while descending through the tubes of the apparatus B, is cooled in the cooling section by indirect cooling, i.e. by heat exchange with the cooling water passing through the shell side of the apparatus B, withdrawn at the bottom and recycled.

In FIG. 10, a countercurrent flow type, vertical pyrolysis apparatus B' is shown, where the dioxins-adsorbed carbonaceous adsorbent 11 descends through the tubes of the vertical apparatus B' in the same manner as in the case of the above-mentioned parallel flow type, but the outlet 13 for the desorbed gases is provided at the upper part above the heating section of the apparatus B'.

By using the pyrolysis apparatuses B and B', energy waste and undesirable recombination of decomposed dioxins into original dioxins due to the establishing of such a high temperature as so far required for the pyrolysis of dioxins at about 1,300° C. for combustion, etc. of dioxins adsorbed on the carbonaceous adsorbent could be eliminated.

SUMMARY OF THE INVENTION

An object of the present invention is to provide a process for pyrolysis of dioxins adsorbed on a carbonaceous adsorbent such as activated carbon or activated cokes with a much higher efficiency than those of the above-mentioned cases of Disclosed Prior Art.

According to the present invention, there is provided a process for low temperature pyrolysis of dioxins, which comprises heating a dioxins-adsorbed carbonaceous adsorbent in the presence of an alkali component in an oxygen-deficient state at an oxygen concentration of not more than 1% or in an inert atmosphere at 350° C. or higher for at least one hour in a reactor having a heating section and being filled with the dioxins-adsorbed carbonaceous adsorbent.

In the foregoing drawings, reference letters and numerals have the following designations: A, B: parallel flow type, vertical pyrolysis apparatus; A', B': countercurrent flow type, vertical pyrolysis apparatus; 1, 11: carbonaceous adsorbent, 2: inlet for carrier gas (inert gas); 3, 13; outlet for desorbed gas; 4, 14: inlet for hot gas; 5, 15: outlet for hot gas; 6, 16: inlet for cooling water; 7, 17: outlet for cooling water; 8, 9, 12, 18: seal valve; 10: roll feeder; and 19: feeder.

Figure 11:
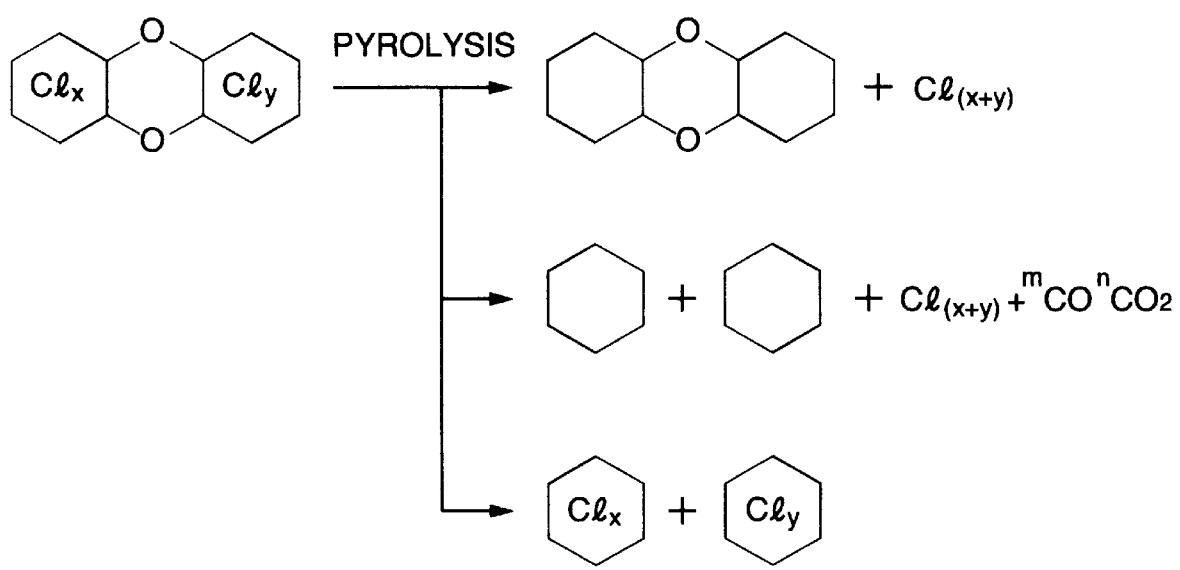
FIG. 11 is a structural view showing pyrolysis process of dioxins.

FIG. 11 shows thermal decomposition steps of dioxins.

DETAILED DESCRIPTION OF THE INVENTION

The present invention include the following embodiments:

(1) Parallel flow of the inert gas in the same direction as that of the stream of carbonaceous adsorbent.

(2) Countercurrent flow of the inert gas in the direction opposite to that of the stream of carbonaceous adsorbent.

(3) Charging of the dioxins-adsorbed carbonaceous adsorbent mixed with a solid component such as urea, an ammonium salt, etc. as an alkali component into the heating section.

(4) Charging of dioxins-adsorbed carbonaceous adsorbent sprayed with ammonia in a liquid state as an alkali component into the heating section.

(5) Charging of an ammonia gas as an alkali component mixed with an externally introduced carrier gas (inert gas) into the heating section.

(6) Charging of a dioxins-adsorbed carbonaceous adsorbent with an alkali component adsorbed thereon in advance into the heating section.

The term "Inert gas" herein used means a carrier gas to be introduced externally and also a gas generated by desorption of the components adsorbed on the carbonaceous adsorbent by heating. That is, the carrier gas may be introduced externally or not.

Related processes of Disclosed Prior Art have been already explained above, referring to FIGS. 7 to 10. As a result of further studies of the related processes of Disclosed Prior Art, the present inventor has found that more efficient low temperature pyrolysis of dioxins can be made by the presence of an alkaline substance such as ammonia, urea, and compounds of alkali metals, alkaline earth metals, etc. during the pyrolysis of the dioxins-adsorbed carbonaceous adsorbent such as activated carbon, activated cokes, etc.

The alkali component can be made present in the following procedures:

(1) Procedure for directly injecting an alkali component such as ammonia, etc. in a gaseous state to the heating section.

(2) Procedure for charging the dioxins-adsorbed carbonaceous adsorbent mixed with an alkali component in a solid state to the heating section.

(3) Procedure for charging the dioxins-adsorbed carbonaceous adsorbent sprayed with an alkali component (urea or an ammonium salt) in a liquid state to the heating section.

(4) Procedure for charging the dioxins-adsorbed carbonaceous adsorbent further adsorbed with an alkali component in advance to the heating section.

(5) Any other procedure, so long as it can make an alkali component present in the heating section.

In the present invention, an alkali component works as a catalyst. However, the alkali component is used preferably in an amount at least approximately equivalent to the chlorine included in dioxins. The amount of alkali component equivalent to chlorine is, for example, 1 mole of ammonia per 1 gram-atom of chlorine in case of ammonia, and 0.5 mole of urea per 1 gram-atom of chlorine in case of urea.

DESCRIPTION OF PREFERRED EMBODIMENTS

The present invention will be described below on the basis of the individual foregoing procedures, referring to Drawings.

Figure 1:
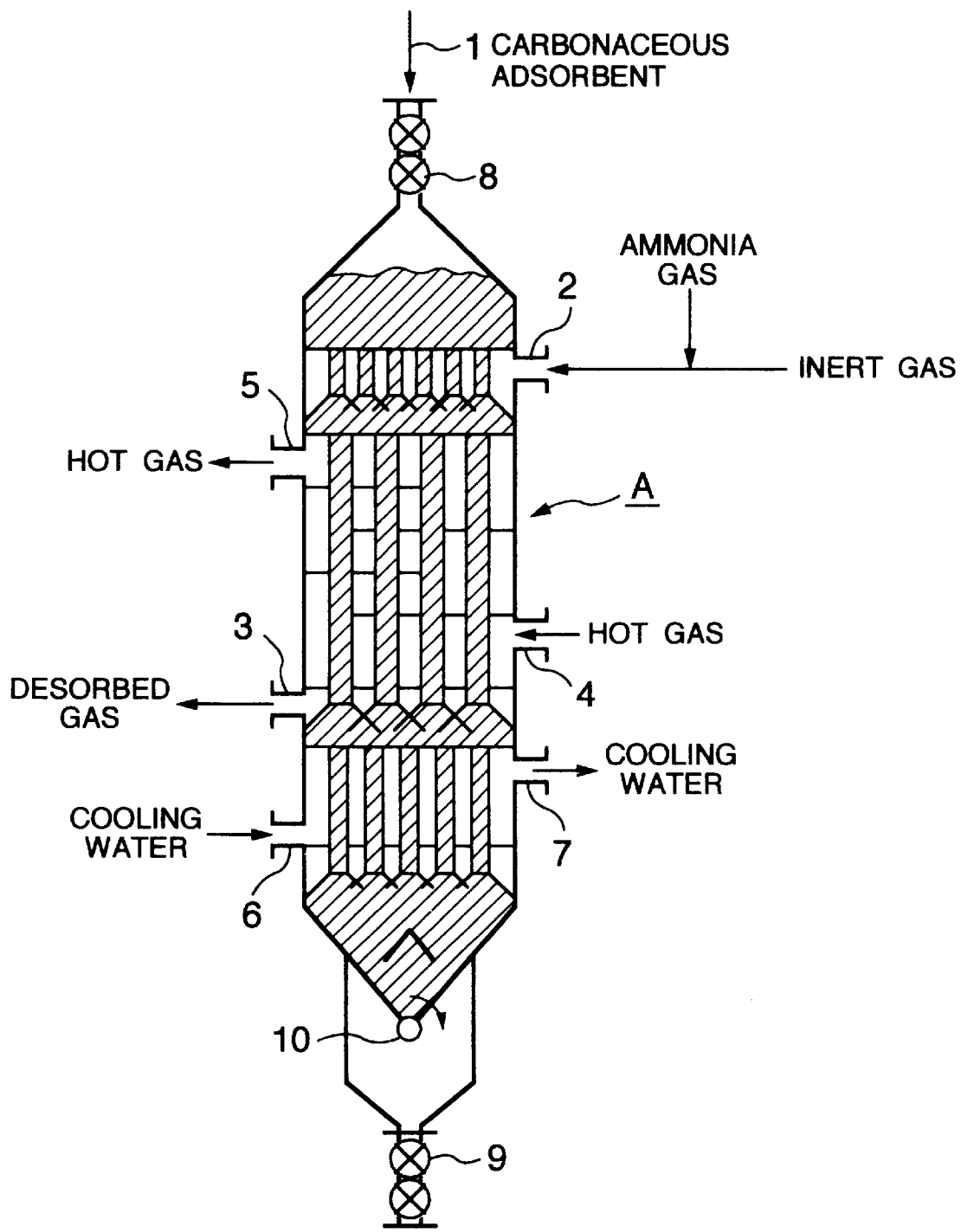
FIG. 1 is a cross-sectional view of a parallel flow type, vertical pyrolysis apparatus using a carrier gas (inert gas) mixed with an ammonia gas.
Figure 2:
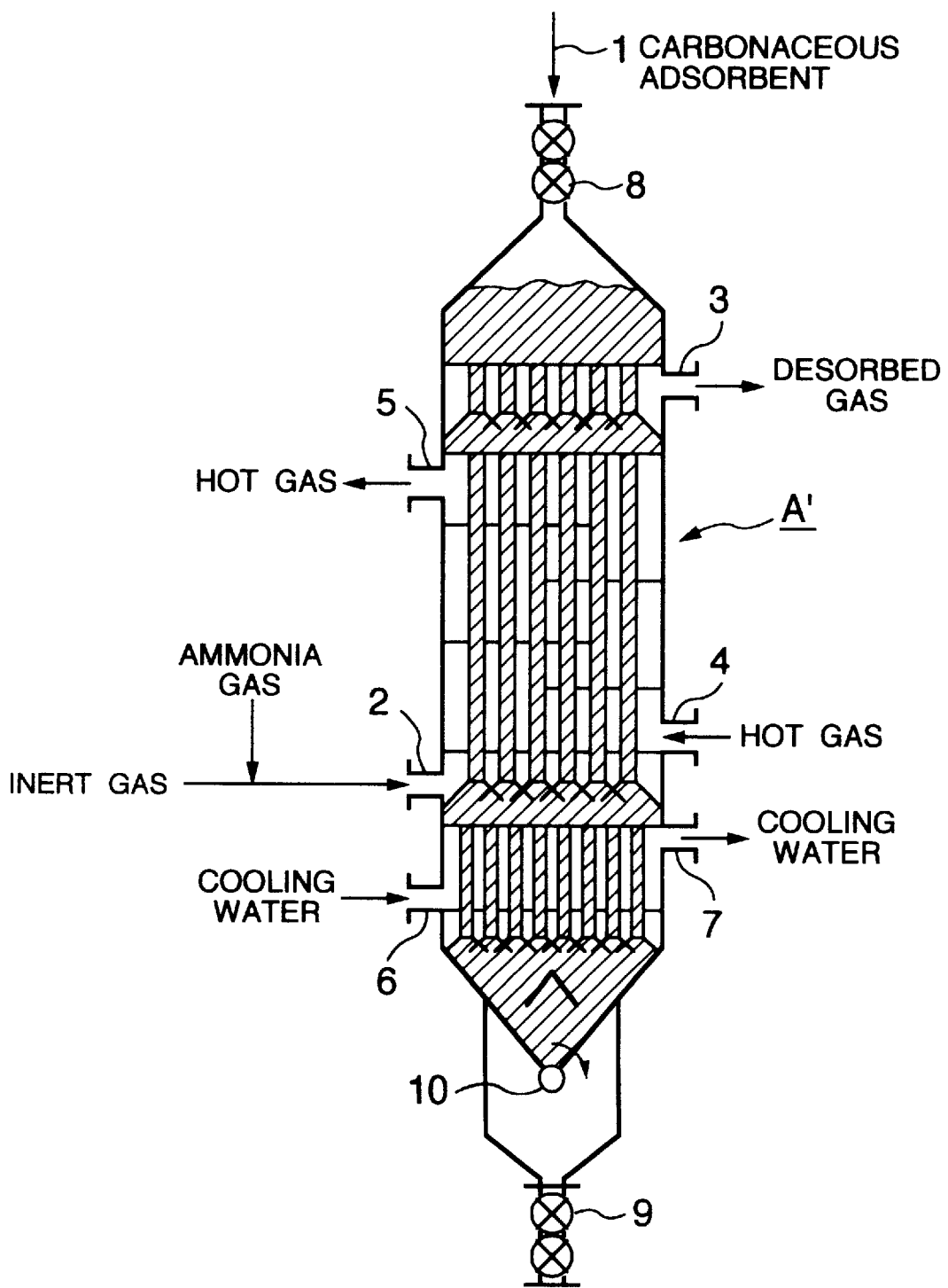
FIG. 2 is a cross-sectional view of a countercurrent flow type, vertical pyrolysis apparatus using the same carrier gas as in FIG. 1.
Figure 7:
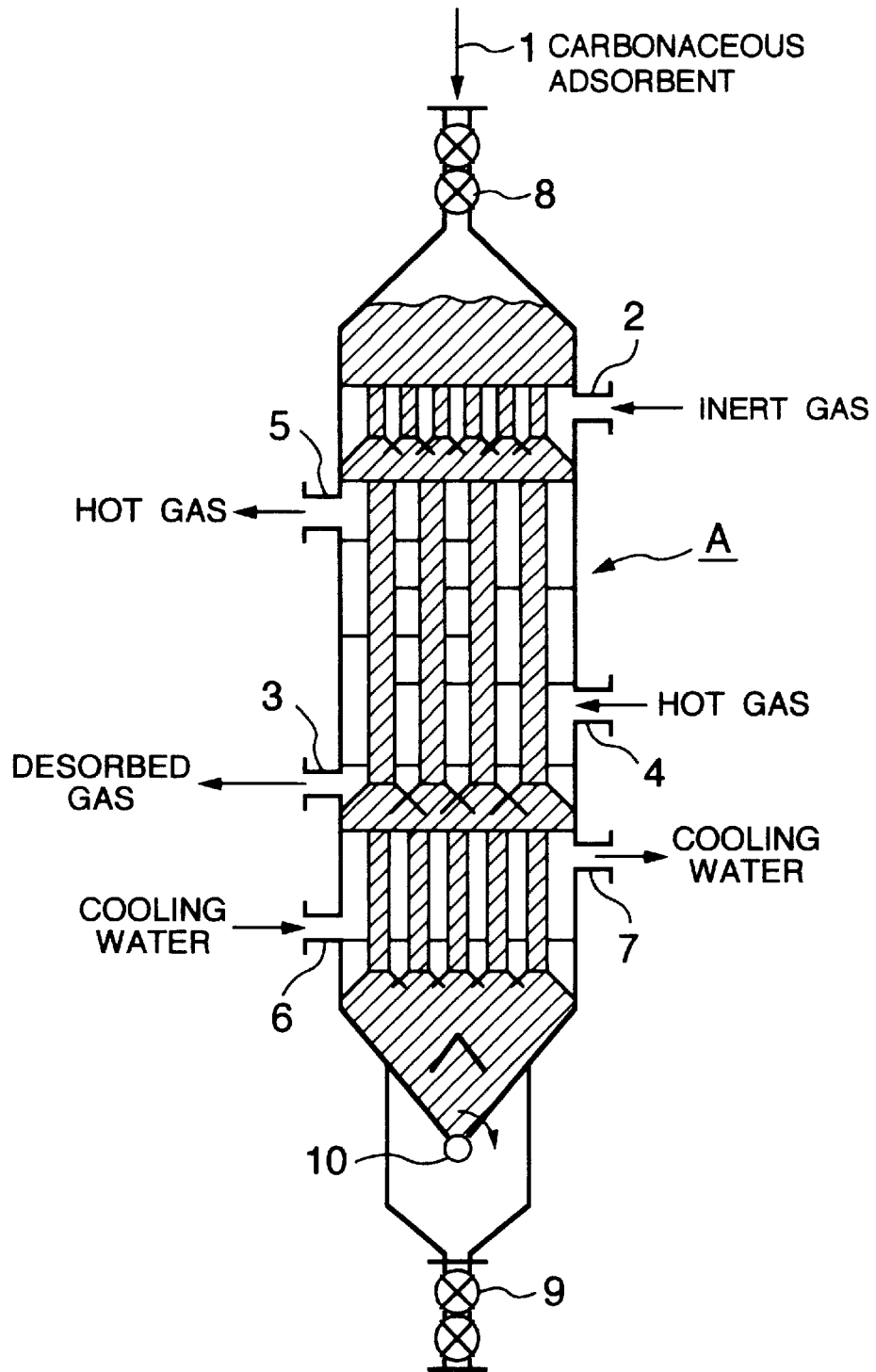
FIG. 7 is a cross-sectional view of a prior art parallel flow type, vertical pyrolysis apparatus using an inert gas.

FIGS. 1 and 2 show a procedure for directly injecting an ammonia gas in a gaseous state to the heating section, which comprises introducing a carrier gas (inert gas) directly mixed with an ammonia gas as an alkali component from inlet 2 for carrier gas in a parallel flow type, vertical pyrolysis apparatus A as shown in FIG. 7.

Figure 8:
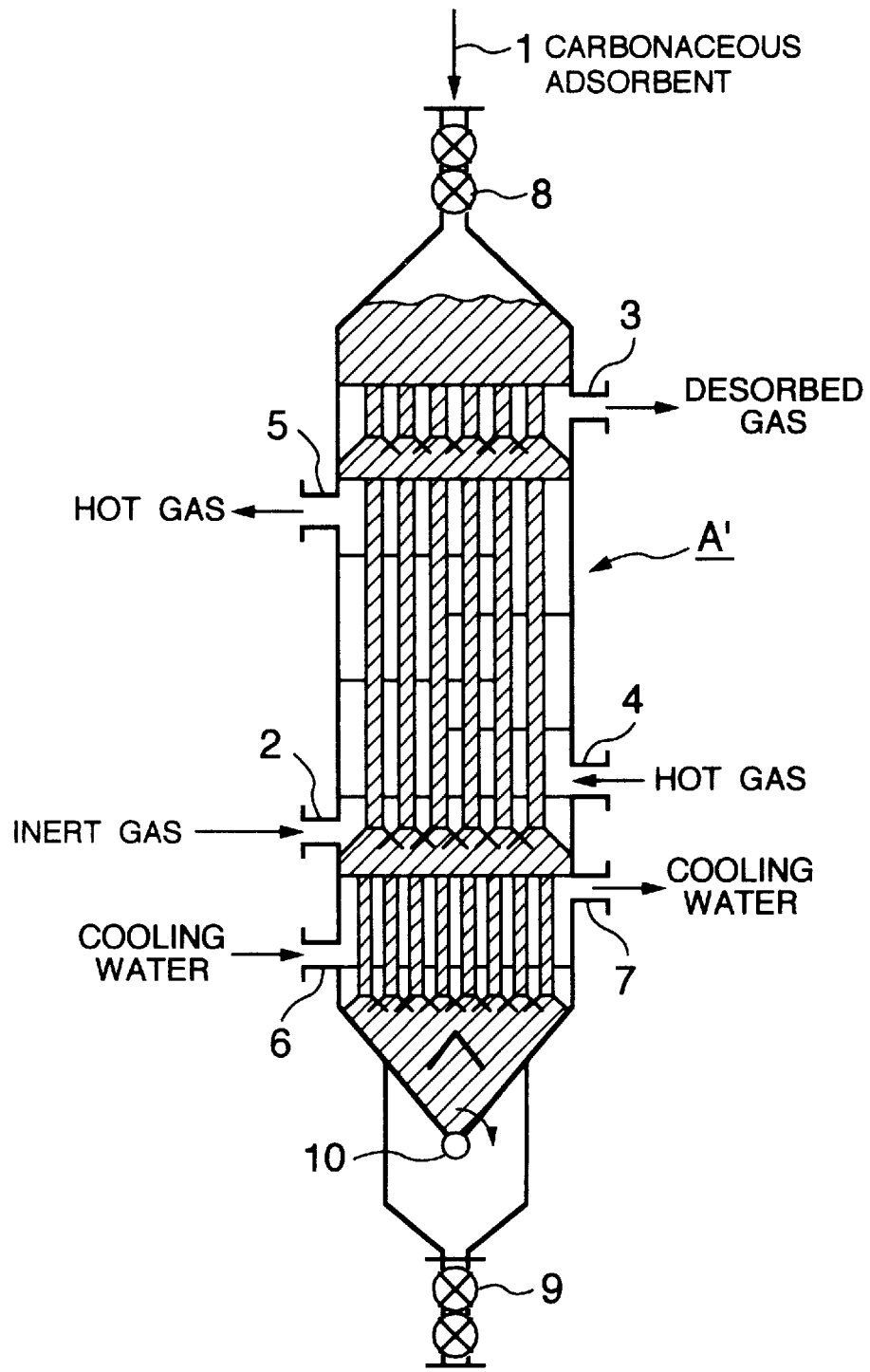
FIG. 8 is a cross-sectional view of a prior art countercurrent flow type, vertical pyrolysis apparatus using the same inert gas as in FIG. 7.
Figure 9:
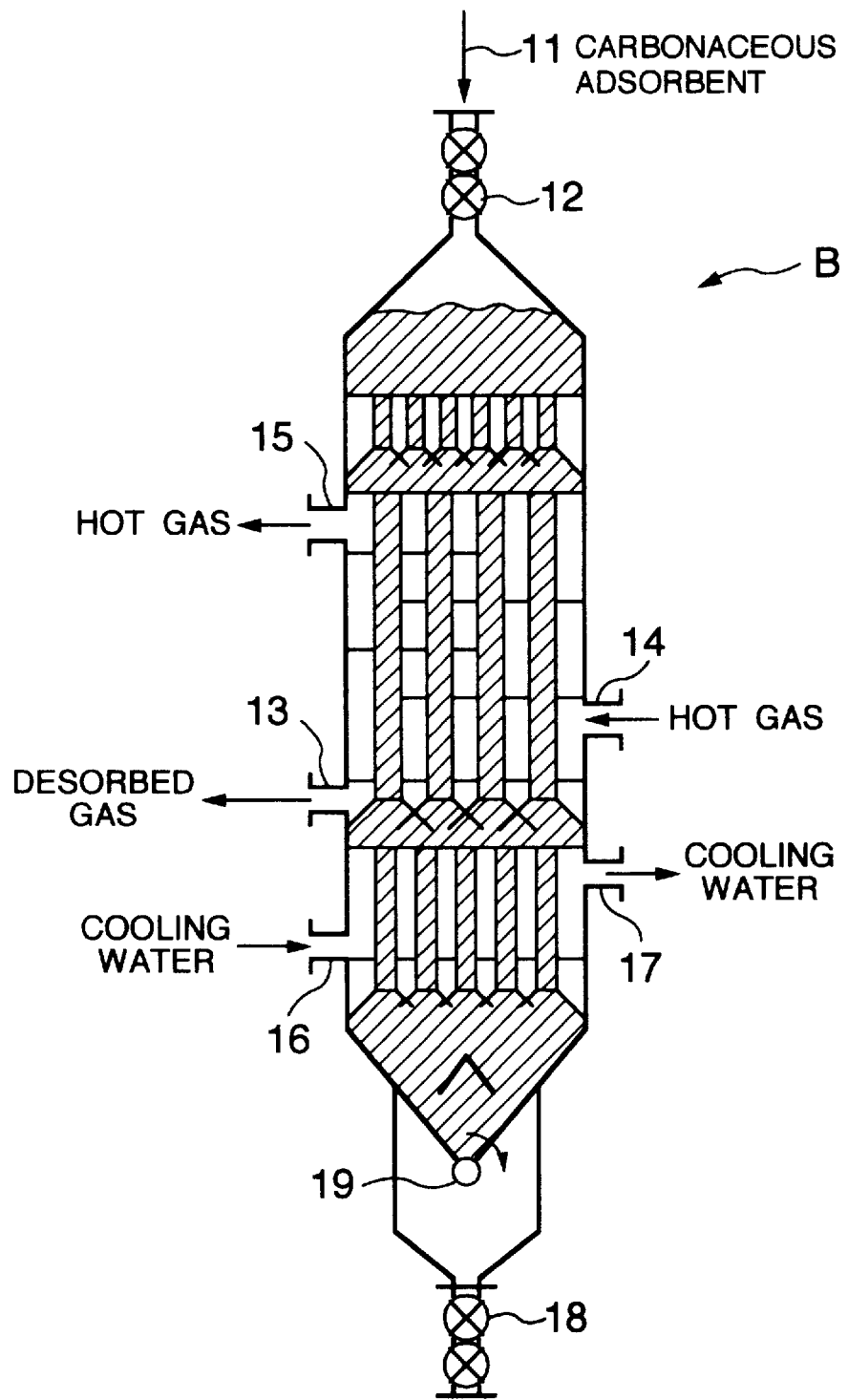
FIG. 9 is a cross-sectional view of a prior art parallel flow type, vertical pyrolysis apparatus using an oxygen-deficient state without using an inert gas.
Figure 10:
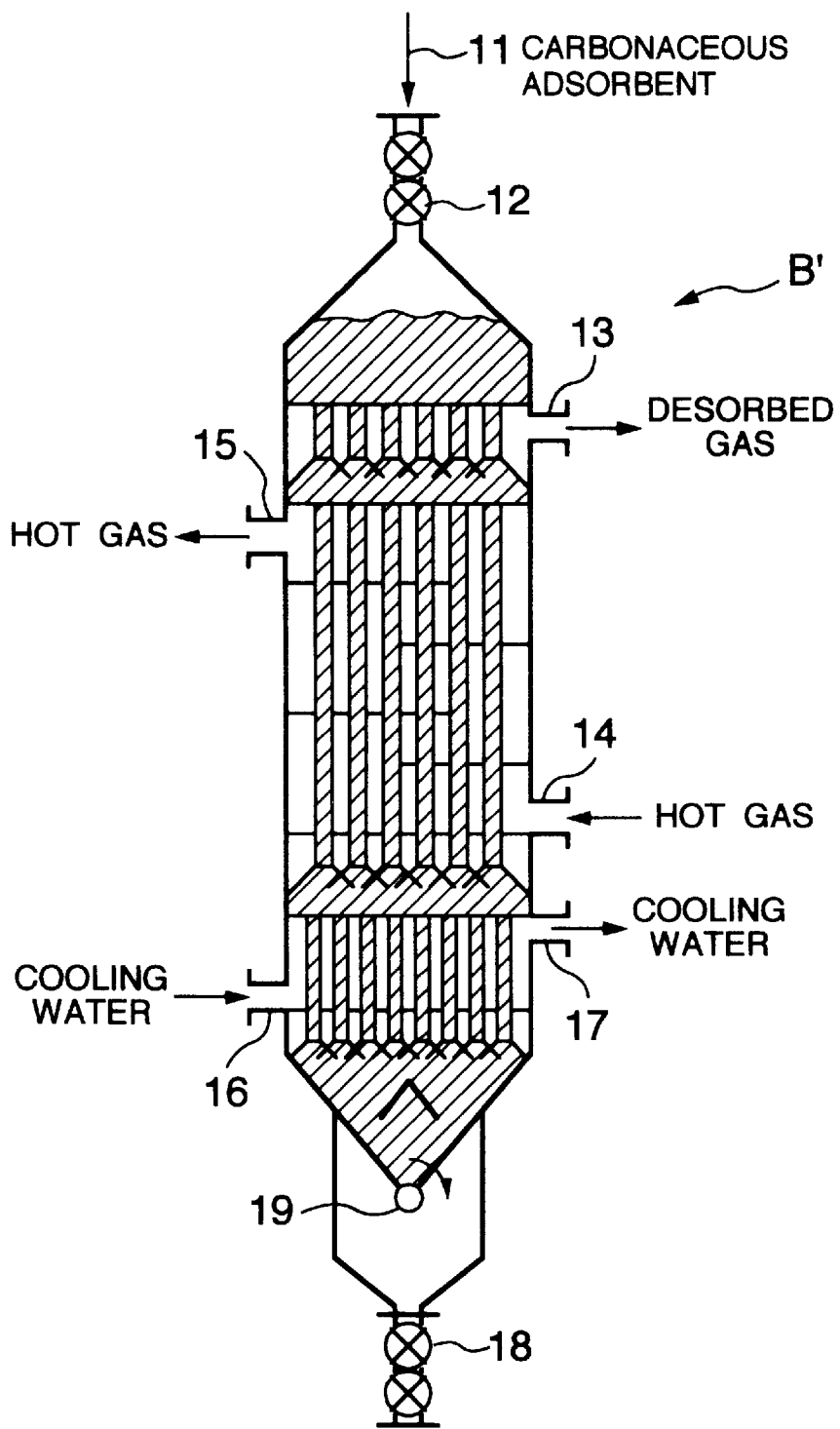
FIG. 10 is a cross-sectional view of a prior art countercurrent flow type, vertical pyrolysis apparatus using the same oxygen-deficient state as in FIG. 9.

FIG. 2 shows introduction of a carrier gas mixed with an ammonia gas as an alkali component from inlet 2 for carrier gas provided at the bottom part of the heating section of a countercurrent flow type, vertical pyrolysis apparatus A' as shown in FIG. 8 and discharging the carrier gas from outlet 3 for desorbed gas provided at the top above the heating section.

Figure 3:
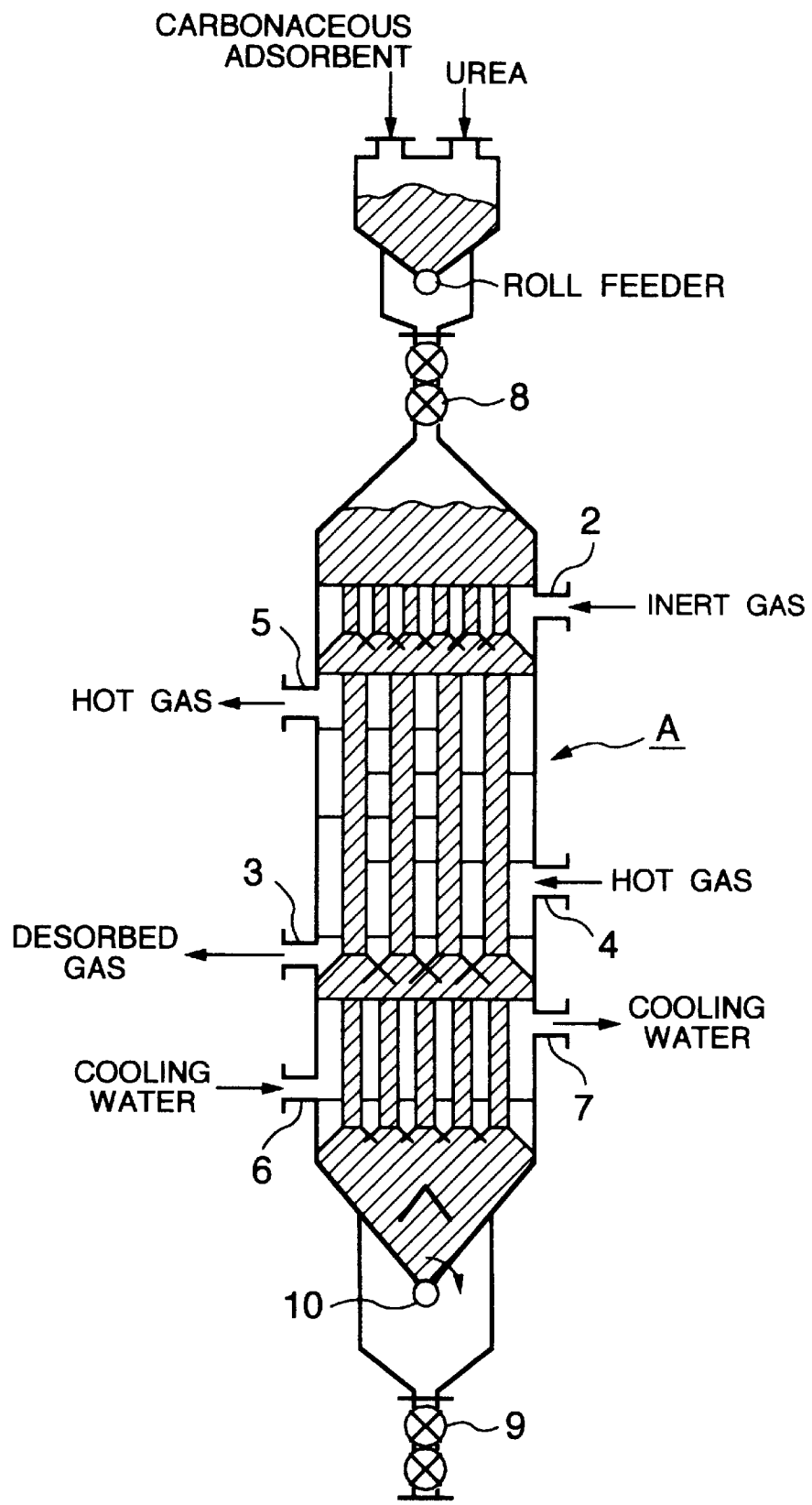
FIG. 3 is a cross-sectional view of a parallel flow type, vertical pyrolysis apparatus, where a dioxins-adsorbed activated carbon mixed with urea is charged into the heating section.

FIG. 3 shows a procedure for charging the dioxins-adsorbed carbonaceous adsorbent mixed with urea as an alkali component in a solid state into the heating section from the top of a parallel flow type, vertical pyrolysis apparatus A as shown in FIG. 1 through a seal valve 8.

Figure 4:
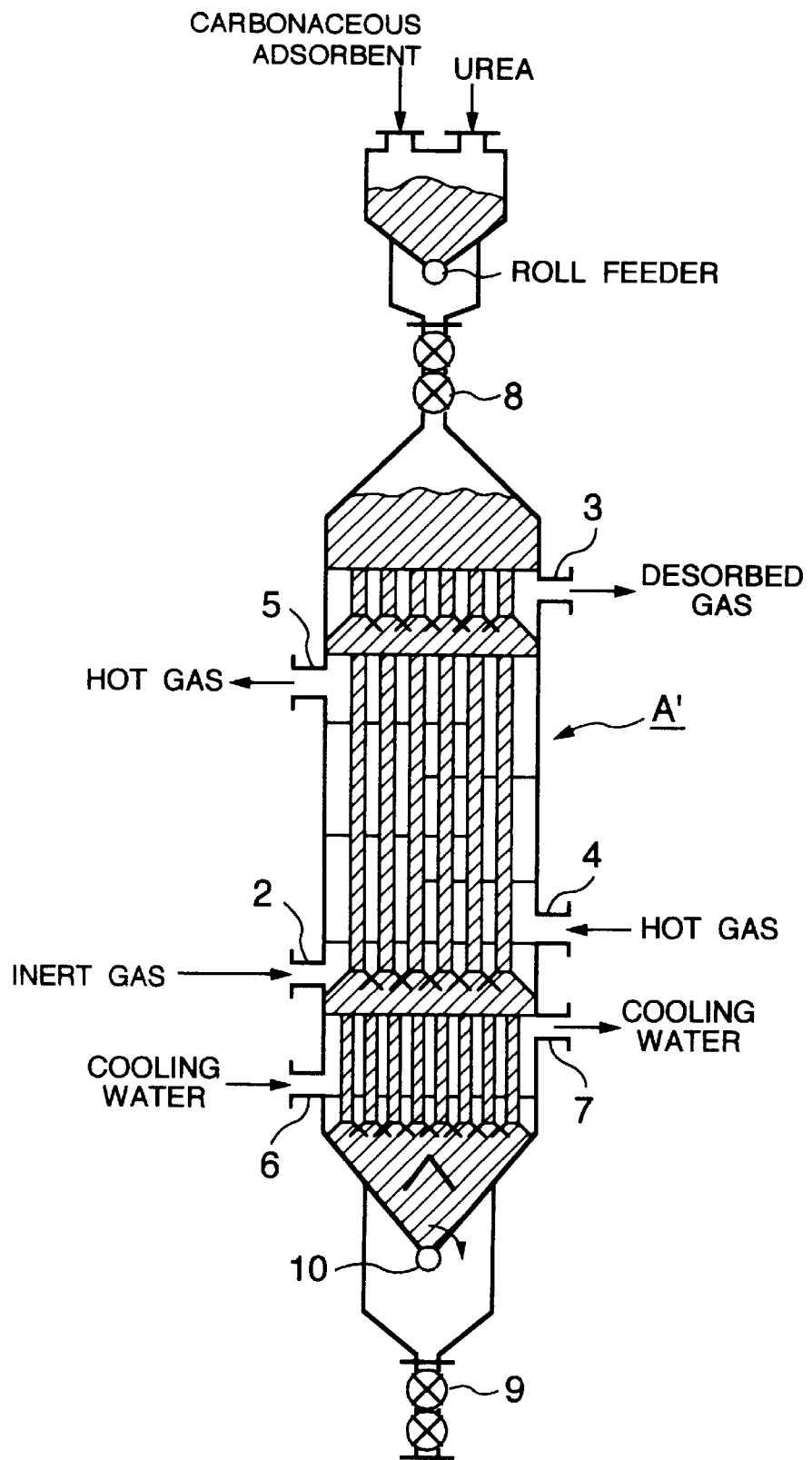
FIG. 4 is a cross-sectional view of a countercurrent flow type, vertical pyrolysis apparatus, where the same dioxins-adsorbed activated carbon mixed with urea as in FIG. 3 is charged into the heating section.

FIG. 4 shows a procedure for charging the dioxins-adsorbed carbonaceous adsorbent mixed with urea as an alkali component in a solid state into the heating zone from the top of a countercurrent flow type, vertical pyrolysis apparatus A' as shown in FIG. 2.

Figure 5:
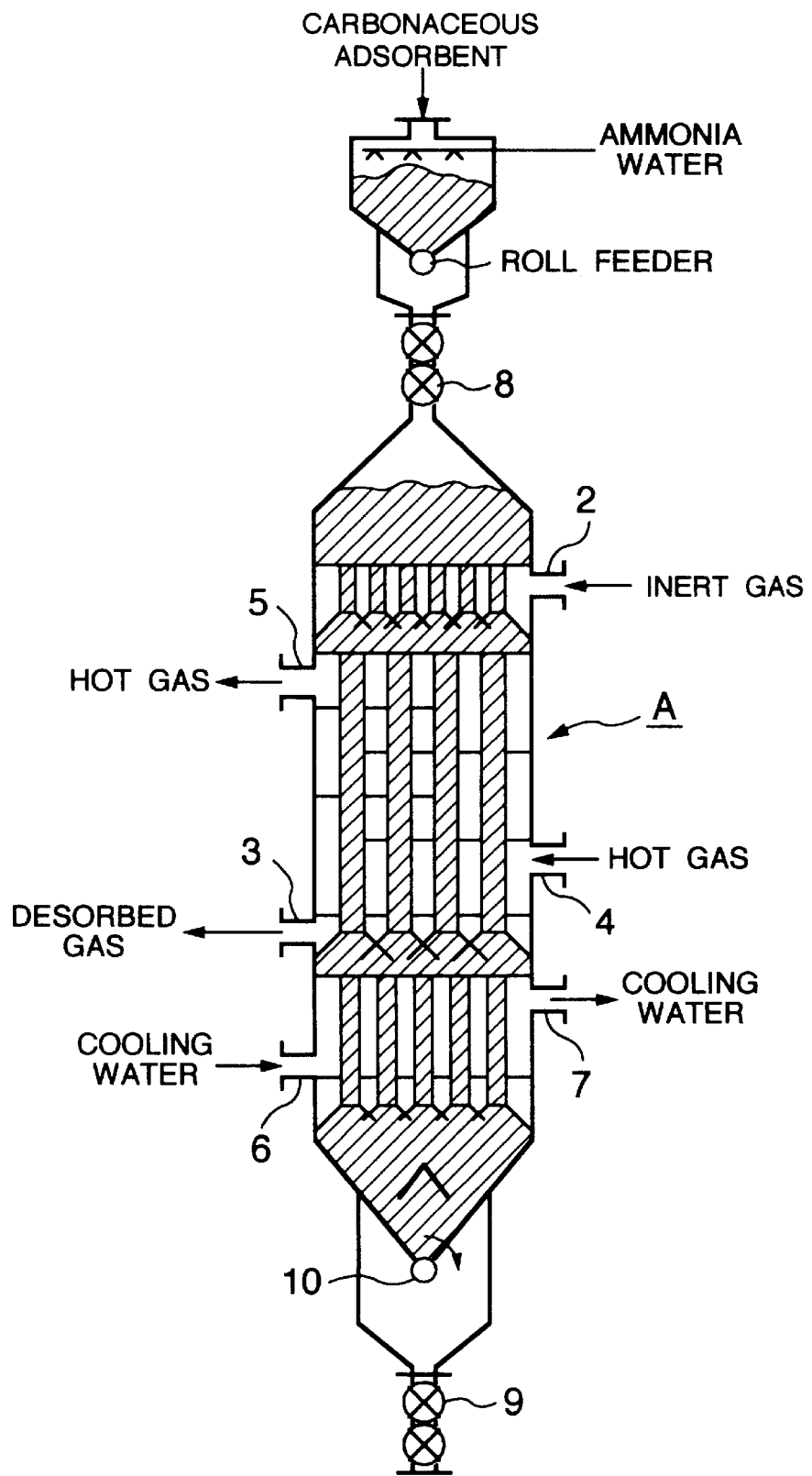
FIG. 5 is a cross-sectional view of a parallel flow type, vertical pyrolysis apparatus using dioxins-adsorbed activated carbon while spraying ammonia water thereon.

FIG. 5 shows a procedure for charging the dioxins-adsorbed carbonaceous adsorbent sprayed with ammonia water as an alkali component in a liquid state into the heating section from the top of a parallel flow type, vertical pyrolysis apparatus A as shown in FIG. 7.

Figure 6:
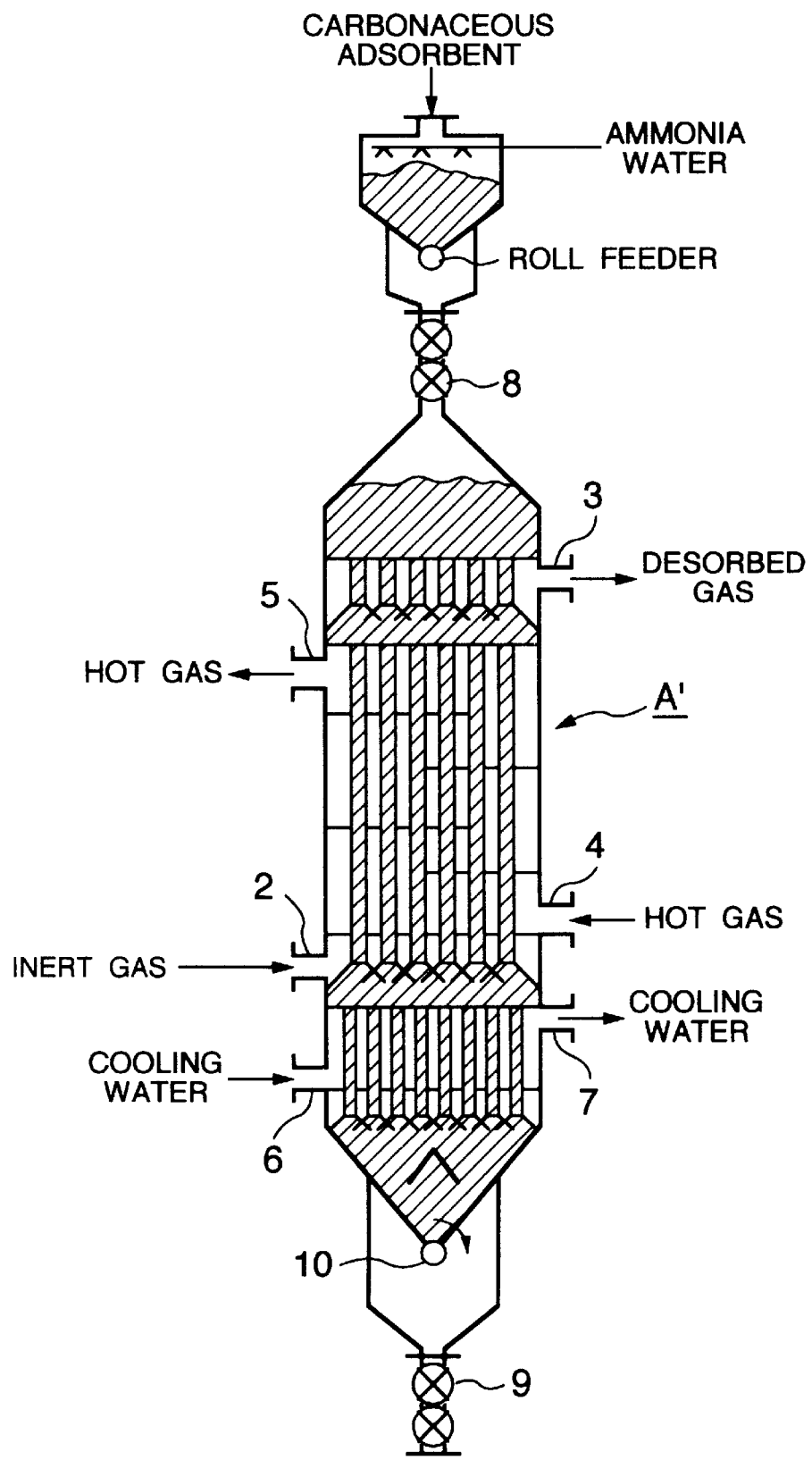
FIG. 6 is a cross-sectional view of a countercurrent flow type, vertical pyrolysis apparatus using the same dioxins-adsorbed activated carbon sprayed with ammonia water in the same manner as in FIG. 5.

FIG. 6 shows a procedure for charging the dioxins-adsorbed carbonaceous adsorbent sprayed with ammonia water as an alkali component in a liquid state to the heating section in a countercurrent flow type, vertical pyrolysis apparatus A' as shown in FIG. 8. Pyrolysis apparatuses for dioxins-containing carbonaceous adsorbent together with an alkali component as shown in FIGS. 1 to 6 are apparently the same as shown in FIGS. 7 to 10 showing the related Disclosed Prior Art.

As described above, modes of thermally decomposing dioxins by supplying a carrier gas mixed with an alkali component to the dioxins-adsorbed carbonaceous adsorbent or charging the dioxins-adsorbed adsorbent mixed with urea or sprayed with ammonia water into the heating section includes a dechlorination action to release chlorine components from the dioxins, and it seems that the released chlorine components are mixed with the externally supplied alkali component to form salts, which are discharged to the system outside together with the thermally decomposed activated carbon.

Tables 1 and 2 show results of analysis of pyrolysis of dioxins-adsorbed activated carbon granules in the case of the presence of ammonia and the case of the absence of ammonia, respectively, where it was also confirmed that the dioxide were not leaked into the effluent gas when the temperature of dioxins-adsorbed carbonaceous adsorbent was elevated for pyrolysis.

TABLE 1

Results of pyrolysis of dioxins-adsorbed activated carbon granules in the presence of ammonia (unit: ng-TEQ/g-AC)

|  | Before pyrolysis | After pyrolysis | Effluent gas |
|---|---|---|---|
| PCDD* | 31.030 | 3.994 | 0.023 |
| PCDF** | 56.445 | 0.419 | 0.016 |
| Total | 87.475 | 4.413 | 0.039 |

TABLE 2

Results of pyrolysis of dioxins-adsorbed activated carbon granules in the absence of ammonia (unit: ng-TEQ/g-AC)

|  | Before pyrolysis | After pyrolysis | Effluent gas |
|---|---|---|---|
| PCDD* | 31.030 | 12.779 | 0.065 |
| PCDF** | 56.445 | 1.882 | 0.068 |
| Total | 87.475 | 14.661 | 0.132 |

Remarks:
*poly-chloro-dibenzoparadioxin
**poly-chloro-dibenzofuran

As described above, by adding a carrier gas (inert gas) mixed with an ammonia gas as an alkali component to a dioxins-adsorbed carbonaceous adsorbent, or charging the dioxins-adsorbed carbonaceous adsorbent mixed with urea as an alkali component in a solid state or sprayed with ammonia water as an alkali component in a liquid state into the heating section of a pyrolysis apparatus for thermally decomposing dioxins adsorbed on the carbonaceous adsorbent, dioxins adsorbed on the carbonaceous adsorbent undergo pyrolysis and dechlorination to release chlorine components contained in the dioxins therefrom, and the released chlorine components are combined with the externally supplied alkali component to form salts which are discharged to the system outside together with the dioxins-freed carbonaceous adsorbent. That is, pyrolysis of dioxins can be more efficiently carried out by externally adding an alkali component to the dioxins-adsorbed carbonaceous adsorbent and combining the released chlorine components from the dioxins with the externally added alkali components to form salts.

What is claimed is:

1. A process for pyrolysis of dioxins, which comprises heating a dioxins-adsorbed carbonaceous adsorbent in an oxygen-deficient state at an oxygen concentration of not more than 1% or in an inert gas at a temperature of 350° C. to less than 1300° C. for at least one hour in a reactor having a heating section and being filled with the dioxins-adsorbed carbonaceous adsorbent, wherein ammonia, an ammonium salt or urea is added into the reactor.

2. A process according to claim 1, wherein the inert gas flows in the heating section of the reactor in parallel with a stream of the carbonaceous adsorbent.

3. A process according to claim 1, wherein the inert gas flows in the heating section of the reactor in a direction opposite to that of a stream of the carbonaceous adsorbent.

4. A process according to claim 1, 2 or 3, wherein the dioxins-adsorbed carbonaceous adsorbent is mixed with urea or an ammonium salt and charged into the heating section of the reactor.

5. A process according to claim 1, 2 or 3, wherein the dioxins-adsorbed carbonaceous adsorbent is sprayed with ammonia water and charged into the heating section of the reactor.

6. A process according to claim 1, 2 or 3, wherein an externally supplied carrier gas or inert gas is mixed with an ammonia gas and charged into the heating section of the reactor.

7. A process according to claim 1, 2 or 3, wherein the dioxins-adsorbed carbonaceous adsorbent is adsorbed with ammonia, an ammonium salt or urea in advance and charged into the heating section of the reactor.

* * * * *